United States Patent [19]

Buske et al.

[11] Patent Number: 4,622,160

[45] Date of Patent: Nov. 11, 1986

[54] HEAT-TRANSFER FLUID

[75] Inventors: Gary R. Buske; Terry L. Wenger; John A. Beyrau, all of Midland, Mich.

[73] Assignee: The Dow Chemical Company, Midland, Mich.

[21] Appl. No.: 790,549

[22] Filed: Oct. 23, 1985

[51] Int. Cl.$^4$ .............................................. C09K 5/00
[52] U.S. Cl. ...................................... 252/73; 252/570; 252/578
[58] Field of Search ........................ 252/73, 570, 578

[56] References Cited

U.S. PATENT DOCUMENTS

| | | | |
|---|---|---|---|
| 2,172,391 | 9/1939 | Krase | 252/73 |
| 2,902,425 | 9/1959 | Kosmin et al. | 252/73 |
| 3,888,777 | 6/1975 | Jackson et al. | 252/73 |
| 3,907,696 | 9/1975 | Jackson et al. | 252/73 |
| 3,931,028 | 1/1976 | Jackson et al. | 252/73 |
| 3,966,626 | 6/1976 | Jackson et al. | 252/73 |
| 4,054,533 | 10/1977 | Watson | 252/73 |
| 4,442,027 | 4/1984 | Sato et al. | 252/574 |

Primary Examiner—Robert A. Wax

[57] ABSTRACT

Wide range heat-transfer fluids can be made by mixing methyl and/or ethyl biphenyls with diethylbenzenes. The fluids can be used at temperatures down to −20° F. (−29° C.).

16 Claims, No Drawings

HEAT-TRANSFER FLUID

BACKGROUND OF THE INVENTION

This invention relates to heat-transfer fluids.

Heat-transfer fluids are useful to transfer heat from a heat source to a heat sink. Heat-transfer fluids are useful, for example, in chemical manufacturing processes to heat and/or cool reaction mixtures.

It does not matter what the actual temperature of the heat source and heat sink are as long as the heat-transfer fluid is pumpable, can be contained in the process equipment and does not decompose at an unacceptable rate at the operational temperatures.

One useful heat-transfer fluid is the eutectic mixture of diphenyl oxide and biphenyl described in U.S. Pat. No. 1,882,809. A major drawback is the high freezing point of the mixture (54° F.). Additives to this eutectic mixture such as biphenylphenyl ethers described in U.S. Pat. No. 3,888,777 lower the freezing point. However, some fluids have viscosities large enough to render the heat-transfer fluid unpumpable and thereby useless as heat-transfer fluids at temperatures far above their freezing points.

It would be desirable to have a heat-transfer fluid which is useful at low temperatures as well as high temperatures.

SUMMARY OF THE INVENTION

The present invention is a heat-transfer fluid comprising a mixture of (a) a lower alkyl biphenyl and (b) a diethyl benzene in proportions such that the mixture has its components in such relative amounts that the heat-transfer fluid both is pumpable at a temperature of −20° F. (−29° C.) and a normal boiling point above about 360° F. (182° C.).

It is surprising that the heat-transfer fluids of this invention are both pumpable at −20° F. (−29° C.) and have such a high normal boiling point.

These heat-transfer fluids are particularly useful as heat-transfer fluids for processing equipment located outside any building in climates where the outside temperatures are below about 20° F. (−6° C.). They are also particularly useful in processes where alternative heating and cooling are employed.

DETAILED DESCRIPTION OF THE ILLUSTRATIVE EMBODIMENTS

The lower alkyl biphenyls (biphenyls) used in the practice of this invention are well-known. They are positional isomers of each other, having the general formula

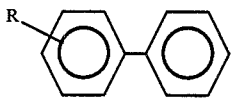

in which R is a lower alkyl radical, preferably containing fewer than about 6 carbons, more preferably containing 1 or 2 carbons. The most preferred lower alkyl biphenyls are ethyl biphenyls. The relative amounts of the ortho, para and meta isomers are not critical to the practice of this invention. It is preferred that the ratio of meta to para isomer be between about 2:1 to about 3:1. It is preferred that as little ortho isomer be present as possible.

The diethylbenzenes used in the practice of this invention are well-known. They are positional isomers of each other, having the general formula

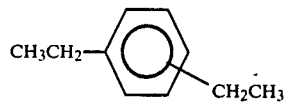

The relative amounts of the ortho, para and meta isomers are not critical to the practice of this invention. It is preferred that at least about 40 percent meta isomer be present with as small an amount of ortho as is possible, preferably below about 4 percent.

The compounds of the heat-transfer fluid can be mixed in any manner and order to produce the heat-transfer fluids of this invention. Preferably, the compounds are mixed in a blending tank.

The compounds of the heat-transfer fluid are employed in relative amounts such that the resulting heat-transfer fluid is pumpable at a temperature of −20° F. (−29° C.). By "pumpable" it is meant that the heat-transfer fluid can be pumped by conventional pumping equipment such as centrifugal pumps and positive displacement pumps and the like through any required heat exchangers. Preferably, the heat-transfer fluid has a viscosity at a temperature of −20° F. (−29° C.) less than about 45 centipoise, more preferably less than about 30 centipoise and most preferably less than about 20 centipoise. The heat-transfer fluid also has a normal boiling point above about 360° F. (182° C.), preferably above about 400° F. (204° C.) and most preferably above about 430° F. (221° C.).

Preferably, the weight ratio of diethylbenzenes to biphenyls in the heat-transfer fluid is between about 1:19 and about 19:1. More preferably, the weight ratio of diethylbenzenes to biphenyls in the heat-transfer fluid is greater than about 1:15, even more preferably greater than 1:7 and most preferably greater than about 1:2. More preferably, the weight ratio of diethylbenzenes to biphenyls in the heat-transfer fluid is less than about 15:1, even more preferably less than about 7:1 and most preferably less than about 2:1. Since the composition of the heat-transfer fluid controls both the viscosity and normal boiling points, it will not be possible to independently select both values. Generally, if a change in composition advantageously increases the normal boiling temperature, it also disadvantageously increases the low temperature viscosity of the heat-transfer fluid. The inverse is also true. The heat-transfer fluid's composition should be selected so as to provide the best properties for the particular application contemplated. Preferably, at least about 70 weight percent of the heat-transfer fluid is a lower alkyl biphenyl and diethylbenzene, more preferably at least about 80 weight percent and most preferably at least about 90 weight percent.

The heat-transfer fluids of this invention optionally contain one or more extenders. The extenders preferably are diphenyl oxide and/or biphenyl, more preferably diphenyl oxide and biphenyl. Preferably, the weight ratio of diphenyl oxide to biphenyl is between about 4:1 and about 2:1. These extenders will generally increase the viscosity of the heat-transfer fluid. They may be present in any amount which allows the heat-transfer fluid to have the necessary properties. Preferably, the extenders comprise less than about 30 weight percent of the heat-transfer fluid, more preferably less than about 20 weight percent and most preferably less than about 10 weight percent. To have a significant effect in the cost of the heat-transfer fluid generally at least about 1 weight percent of the heat-transfer fluid is extender, more preferably at least about 5 weight percent. The diphenyl oxide extender is well-known. It has the formula

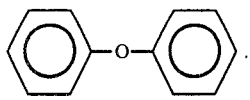

The biphenyl extender is well-known. It has the formula

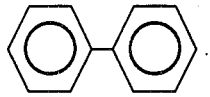

These heat-transfer fluids may be used in the same manner as known heat-transfer fluids are used. They may be used in the same manner as are the heat-transfer fluids of U.S. Pat. Nos. 4,054,533; 3,966,626; 3,931,028 and 3,907,696.

This invention is further illustrated by the following nonlimiting specific embodiments.

EXPERIMENTAL

The various heat-transfer fluids are formulated by combining the requisite materials in a container and agitating the combination for a short time. The composition of the requisite materials determined by gas chromatograph with comparisons to materials of known composition.

The normal boiling points are determined by heating the heat-transfer fluids of the comparative embodiments, in an Ellis still, at atmospheric pressure until boiling commences. The normal boiling points for the specific embodiments are determined by a graphical interpolation between normal boiling points of heat-transfer fluids containing 0, 25, 50, 75 and 100 weight percent diethylbenzenes.

The viscosity at the listed temperatures is determined by a Brookfield viscometer using an ultralow viscosity adaptor for the following embodiments. The viscosity at the listed temperatures for the specific embodiments is determined graphically as is the normal boiling points of the specific embodiments. Table I contains the composition of the various embodiments. All figures are weight percent.

TABLE I

| Embodiment | DEB | EBP | MBP | DPO | BP |
|---|---|---|---|---|---|
| C1* | 100 | 0 | 0 | 0 | 0 |
| C2* | 0 | 100 | 0 | 0 | 0 |
| C3* | 0 | 0 | 100 | 0 | 0 |
| C4* | 0 | 0 | 0 | 100 | 0 |
| C5* | 0 | 0 | 0 | 0 | 100 |
| C6* | 0 | 40 | 40 | 14.6 | 5.4 |
| C7* | 0 | 81.4 | 0 | 13.58 | 5.02 |
| 1 | 16.5 | 70.5 | 0 | 13.0 | 0 |
| 2 | 27.5 | 72.5 | 0 | 0 | 0 |
| 3 | 47.4 | 52.6 | 0 | 0 | 0 |
| 4 | 10 | 72 | 0 | 13.14 | 4.86 |
| 5 | 10 | 36 | 36 | 13.14 | 4.86 |
| 6 | 20 | 64 | 0 | 11.68 | 4.32 |
| 7 | 20 | 32 | 32 | 11.68 | 4.32 |
| 8 | 25 | 60 | 0 | 10.95 | 4.05 |

TABLE I-continued

| Embodiment | DEB | EBP | MBP | DPO | BP |
|---|---|---|---|---|---|
| 9 | 25 | 30 | 30 | 10.95 | 4.05 |
| 10 | 30 | 56 | 0 | 10.22 | 3.78 |
| 11 | 30 | 28 | 28 | 10.22 | 3.78 |
| 12 | 40 | 48 | 0 | 8.76 | 3.24 |
| 13 | 40 | 24 | 24 | 8.76 | 3.24 |
| 14 | 50 | 40 | 0 | 7.3 | 2.7 |
| 15 | 50 | 20 | 20 | 7.3 | 2.7 |
| 16 | 75 | 20 | 0 | 3.65 | 1.35 |
| 17 | 75 | 10 | 10 | 3.65 | 1.35 |

*Not an embodiment of the invention
DEB-diethylbenzene
EBP-ethyl biphenyl
MBP-methyl biphenyl
DPO-diphenyl oxide
BP-biphenyl Table II contains the properties of the various embodiments.

TABLE II

| Embodiment | Normalized Boiling Point (°F.) | Viscosity (centipoise) at | | | |
|---|---|---|---|---|---|
| | | −40° F. | −30° F. | −20° F. | −10° F. |
| C1* | 358 | 2.86 | 2.42 | 2.19 | 1.93 |
| C2* | 545 | 340 | 160 | 98 | 55 |
| C3* | 527 | 750 | 320 | 130 | 65 |
| C4* | 498 | —[1] | —[1] | —[1] | —[1] |
| C5* | 491 | —[1] | —[1] | —[1] | —[1] |
| C6* | 527 | 437 | 199 | 104 | 64 |
| C7* | 527 | 366 | 202 | 118 | 58 |
| 1 | 450[2] | 69 | 49 | 28 | 20 |
| 2 | 420[2] | 36 | 24 | 19 | 13 |
| 3 | 2 | 13 | 10 | 8 | 6 |
| 4 | 482 | 111 | 66 | 44 | 29 |
| 5 | 482 | 128 | 74 | 44 | 28 |
| 6 | 445 | 58 | 36 | 24 | 18 |
| 7 | 445 | 53 | 37 | 24 | 18 |
| 8 | 430 | 41 | 28 | 18 | 15 |
| 9 | 430 | 41 | 28 | 18 | 15 |
| 10 | 410 | 28 | 21 | 14 | 11 |
| 11 | 410 | 23 | 21 | 14 | 11 |
| 12 | 392 | 17 | 13 | 10 | 8 |
| 13 | 392 | 17 | 12 | 10 | 8 |
| 14 | 388 | 10 | 9 | 7 | 6 |
| 15 | 388 | 10 | 8 | 7 | 6 |
| 16 | 368 | 5 | 4 | 4 | 3 |
| 17 | 368 | 5 | 4 | 3 | 3 |

*Not an embodiment of the invention
[1]Solid at this temperature
[2]Estimated

Table II shows the high normal boiling points combined with the low temperature viscosity of the invented heat-transfer fluids and comparative heat-transfer fluids.

I claim:

1. A heat-transfer fluid comprising a mixture of (a) a lower alkyl biphenyl wherein the lower alkyl group(s) contain fewer than about 6 carbon atoms and (b) a diethylbenzene in such proportions that the heat-transfer fluid both is pumpable at a temperature of −20° F. (−29° C.) and has a normal boiling point above about 360° F. (182° C.).

2. The heat-transfer fluid of claim 1 in which the lower alkyl radical contains 1 or 2 carbon atoms.

3. The heat-transfer fluid of claim 1 in which the ratio of diethylbenzene to biphenyls is between about 19:1 and about 1:19.

4. The heat-transfer fluid of claim 3 in which the heat-transfer fluid contains extenders, wherein the extenders comprise diphenyl oxide, biphenyl or mixtures thereof.

5. The heat-transfer fluid of claim 4 in which the extenders comprise less than about 25 weight percent of the heat-transfer fluid.

6. The heat-transfer fluid of claim 4 in which the extenders comprise both diphenyl oxide and biphenyl.

7. The heat-transfer fluid of claim 4 in which the extenders consist essentially of diphenyl oxide, biphenyl or mixtures thereof.

8. The heat-transfer fluid of claim 7 in which the extenders consist essentially of diphenyl oxide and biphenyl.

9. The heat-transfer fluid of claim 8 in which the weight ratio of diphenyl oxide to biphenyl is between about 4:1 and about 2:1.

10. The heat-transfer fluid of claim 2 in which the heat-transfer fluid consists essentially of diethylbenzenes and ethyl biphenyl in a weight ratio between about 1:19 to about 19:1.

11. The heat-transfer fluid of claim 10 which the weight ratio is between about 1:7 an about 7:1.

12. The heat-transfer fluid of claim 11 in which the weight ratio is between about 1:2 and about 7:1.

13. The heat-transfer fluid of claim 1 in which heat-transfer fluid has a viscosity below about 45 centipoise at a temperature of $-20°$ F. ($-29°$ C.).

14. The heat-transfer fluid of claim 13 in which the heat-transfer fluid has a viscosity below about 20 centipoise at a temperature of $-20°$ F. ($-29°$ C.).

15. The heat-transfer fluid of claim 1 in which heat-transfer fluid has a normal boiling point above about 400° F. (204° C.).

16. The heat-transfer fluid of claim 15 in which the heat-transfer fluid has a normal boiling point above 430° F. (221° C.).

* * * * *